United States Patent
Pratt et al.

(10) Patent No.: US 6,421,603 B1
(45) Date of Patent: Jul. 16, 2002

(54) HAZARD DETECTION FOR A TRAVEL PLAN

(75) Inventors: Stephen G. Pratt, St. Louis Park; Gary L. Hartmann, Fridley, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/372,632

(22) Filed: Aug. 11, 1999

(51) Int. Cl.$^7$ .............................................. G06F 17/00
(52) U.S. Cl. ...................... 701/206; 701/208; 701/301; 244/175
(58) Field of Search .......................... 701/4, 14, 9, 202, 701/206, 209, 208, 212, 300, 301; 244/158 R, 175; 340/961, 970; 342/26

(56) References Cited

U.S. PATENT DOCUMENTS

| | | | |
|---|---|---|---|
| 3,936,796 A | 2/1976 | Bateman | 340/27 AT |
| 3,944,968 A | 3/1976 | Bateman et al. | 340/27 AT |
| 3,946,358 A | 3/1976 | Bateman | 340/27 R |
| 3,947,809 A | 3/1976 | Bateman | 340/27 AT |
| 4,030,065 A | 6/1977 | Bateman | 340/27 AT |
| 4,646,244 A | 2/1987 | Bateman et al. | 364/461 |
| 4,706,198 A | 11/1987 | Thurman | |
| 5,086,396 A | 2/1992 | Waruszewski, Jr. | 364/454 |
| 5,220,322 A | 6/1993 | Bateman et al. | 340/970 |
| 5,264,848 A | 11/1993 | McGuffin | 341/94 |
| 5,371,840 A | 12/1994 | Fischer et al. | 395/133 |
| 5,406,286 A | 4/1995 | Tran et al. | 342/13 |
| 5,410,317 A | 4/1995 | Ostrom et al. | 342/65 |
| 5,414,631 A | 5/1995 | Denoize et al. | 364/461 |
| 5,445,021 A | 8/1995 | Cattoen et al. | 73/178 R |
| 5,488,563 A | 1/1996 | Chazelle et al. | 364/461 |
| 5,504,686 A | 4/1996 | Lippitt et al. | 364/444 |
| 5,526,620 A | 6/1996 | Hallsten | 52/246 |
| 5,615,118 A | * 3/1997 | Frank | 701/4 |
| 5,638,282 A | 6/1997 | Chazelle et al. | 364/461 |
| 5,677,842 A | 10/1997 | Denoize et al. | 364/461 |
| 5,798,712 A | 8/1998 | Coquin | 340/970 |
| 5,839,080 A | * 11/1998 | Muller et al. | 701/9 |
| 5,892,462 A | * 4/1999 | Tran | 340/961 |
| 6,005,581 A | * 12/1999 | Gjullin | 345/430 |
| 6,134,500 A | * 10/2000 | Tang et al. | 701/202 |

FOREIGN PATENT DOCUMENTS

| | | | |
|---|---|---|---|
| EP | 0380460 | 8/1990 | G08G/5/04 |

OTHER PUBLICATIONS

Bateman, D., "Development of Ground Proximity Warning Systems (GPWS)", *Royal Aeronautical Society Conference on Controlled Flight into Terrain*, pp. 3.1–3.9, (1994).

Kisslinger, R. L., et al., "Manual Terrain–Following System Development for a Supersonic Fighter Aircraft", *Journal of Aircraft*, 3 (4), pp. 305–309, (1966).

Stone, J., "The Potential For Digital Databases In Flight Planning And Flight Aiding For Combat Aircraft", *NATO AGARD*, ISBN 92–835–0566–2, pp. VI16–1 to VI16–10, (Jun. 1990).

\* cited by examiner

Primary Examiner—William A. Cuchlinski, Jr.
Assistant Examiner—Edward Pipala
(74) Attorney, Agent, or Firm—Kris T. Fredrick

(57) ABSTRACT

A flight plan is modeled by a trajectory with a set of segments having finite lateral and altitude extents between nominal way points. A terrain database stores hierarchical patches with maximum and minimum altitudes and pointers or altitudes for subpatches. Linear-programming inequality constraints match segments with patches. A search finds any terrain locations that impinge upon the trajectory tube, indicating an error condition for the plan. Moving hazards are modeled with segmented trajectories. Conflict with a moving hazard occurs when moving bubbles within both of the trajectories overlap in both space and time.

57 Claims, 6 Drawing Sheets

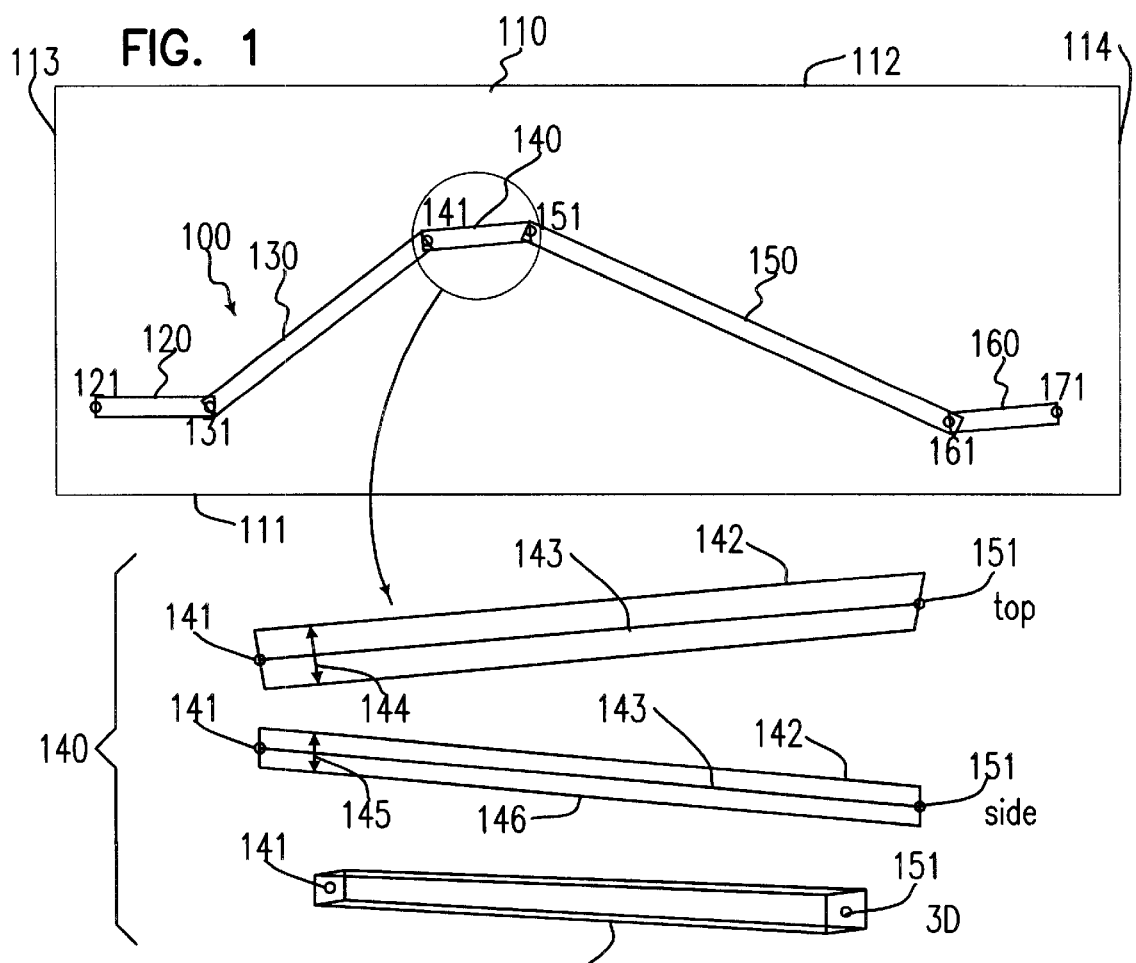
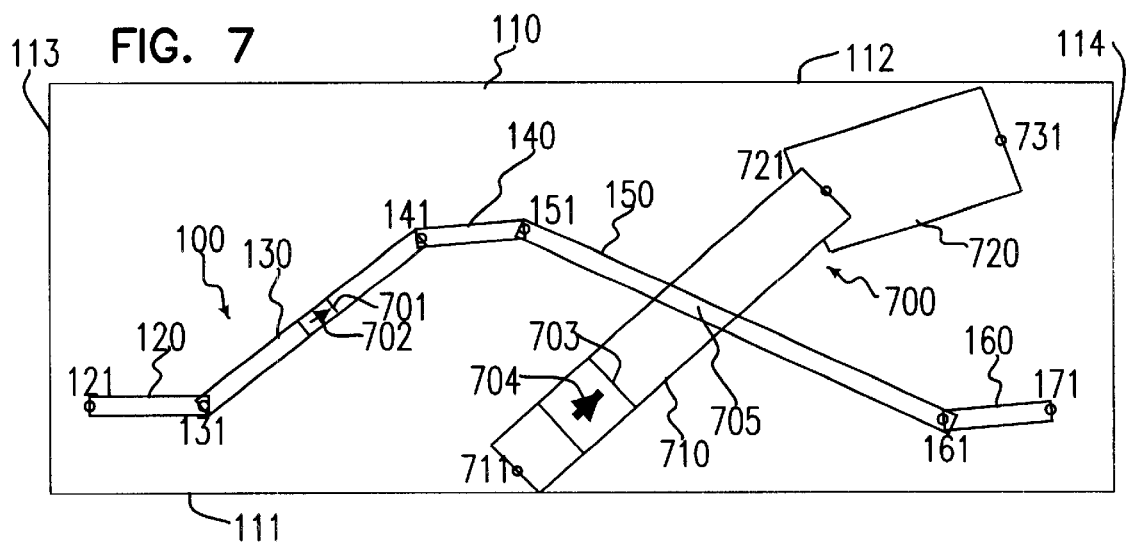

HAZARD DETECTION FOR A TRAVEL PLAN

TECHNICAL FIELD

The present invention relates to vehicle navigation, and more particularly concerns avoidance of terrain and hazardous conditions.

BACKGROUND

Avoidance of terrain and other hazards has been an active field of development for a number of decades. Both military agencies and commercial establishments continue to investigate improved methods for increasing the safety of flights against the possibility of CFIT ("controlled flight into terrain") accidents. There is also a need, particularly for airlines, for improved methods of tracking weather systems with respect to prearranged flight plans from dispatchers.

Military terrain-avoidance systems appeared in the 1960s. A downlooking active radar system measured proximity to local terrain and maintained a specified ground clearance. Some designs included an automatic control loop controlled the aircraft's pitch, maintaining clearance by climbing over obstacles detected by the radar. Other designs provided a display for manual control by the pilot. R. L Kisslinger et al., "Manual Terrain-Following System Development for a Supersonic Fighter Aircraft," *Journal of Aircraft*, Vol. 3, No. 4 (July–August 1966) describes an example..

Similar avoidance systems for civilian aircraft followed a few years later, after radar altimeters were introduced into commercial transports. The altimeter provided an alert upon encountering a preset minimum height above local terrain. D. Bateman, "Development of Ground Proximity Warning Systems (GPWS)," *Royal Aeronautical Society Conference on Controlled Flight into Terrain*, London, Nov. 8, 1994, describes an early system of this kind. This and other examples are found in U.S. Pat. No. 3,936,796 (Bateman), U.S. Pat. No. 3,944,968 (Bateman et al.), U.S. Pat. No. 3,946,358 (Bateman), U.S. Pat. No. 3,947,809 (Bateman), U.S. Pat. No. 4,030,065 (Bateman), U.S. Pat. No. 5,220,322 (Bateman), and U.S. Pat. No. 5,410,317 (Ostrum et al.).

Later, military agencies developed onboard stored terrain data bases for aiding inertial navigation systems in cruise missiles and for displaying real-time terrain to aircraft pilots. J. Stone, "The Potential for Digital Databases in Flight Planning and Flight Aiding for Combat Aircraft," NATO document AGARD-AG-14, June, 1990 describes this concept. Digital map computers provide perspective terrain views with overlays of flight plans and of mission and threat data for current fighter aircraft, as exemplified in U.S. Pat. No. 5,086,396 (Waruszewski), U.S. Pat. No. 5,264,848 (McGuffin), U.S. Pat. No. 5,371,840 (Fischer), U.S. Pat. No. 5,406,286 (Tran et al.), U.S. Pat. No. 5,504,686 (Lippitt et al.), and U.S. Pat. No. 5,526,620 (Kodet et al.).

More recently, commercial systems combined terrain databases with radar sensors to provide a situational display. These systems also incorporate look-ahead algorithms to calculate an aircraft's future location from its present position and velocity vector, and can warn a pilot up to 20 to 60 seconds ahead of an impending loss of adequate terrain clearance. Referred to as TAWS ("terrain awareness and warning systems"), some of these products are described in U.S. Pat. No. 4,646,244 (Bateman), U.S. Pat. No. 5,414,631 (Denoize et al.), U.S. Pat. No. 5,488,563 (Chazelle et al.), U.S. Pat. No. 5,638,282 (Chazelle et al.), U.S. Pat. No. 5,677,842 (Denoize et al.), U.S. Pat. No. 5,798,712 (Coquin), and U.S. Pat. No. 5,839,080 (Muller et al.).

Even the most recent systems, however, are limited by their lack of ability to predict aircraft course and altitude. Extrapolation cannot anticipate course and altitude changes and other maneuvers as an aircraft follows its flight plan.

Flight plans for commercial transports are often prepared hours before departure. Although they are checked for hazards at the time, a trend toward user-defined trajectories and dynamic rerouting create a need for an on-board capability for continuing to check the entire flight plan for hazards during a flight.

SUMMARY OF THE INVENTION

The present invention offers a capability for finding conflicts with terrain and other hazards over an entire predicted flight plan, rather than for only a short time into the future. It can be implemented relatively inexpensively, and requires no additional infrastructure. It can be easily extended to modeling hazards other than terrain, including moving hazards such as weather.

The invention determines whether a predicted plan or trajectory intersects with terrain features or other hazards by modeling it as a dimensioned volume, comparing the volume with a model of the appropriate terrain or other hazard, and reporting any intersection with the trajectory volume. Dangerous situations can be communicated directly in real time to the aircraft crew or other persons. Other significant aspects of the invention can employ a hierarchical intersection determination, constrained-optimization techniques, and moving-hazard tracking.

The invention is not inherently limited to aircraft, and may also find utility in, for example, submarine navigation, trip planning for other vehicles. Potential applications exist in fields such as robotics, for ensuring that robots remain clear of each other and of other obstacles. That is, the terms "plan" and trajectory" should be given a broad umbra. Also, the term "hazard" must be taken broadly to include other types of features to be avoided, or even perhaps to be sought out or approached in some cases.

THE DRAWING

FIG. 1 is a diagram of a trajectory tube for an aircraft flight plan.

FIG. 7 is a diagram adding a moving hazard to the flight plan of FIG. 1.

DETAILED DESCRIPTION

Figure 2:
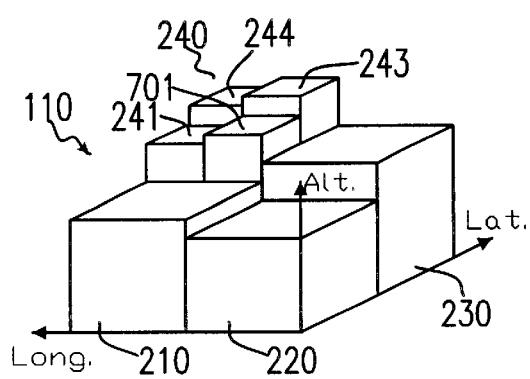
FIG. 2 is a diagram showing a hierarchical representation of a terrain area.

This description and the accompanying drawing illustrate specific embodiments in which the present invention can be practiced, in enough detail to allow those skilled in the art to understand and practice the invention. Other embodiments, including logical, electrical, and mechanical variations, are within the skill of the art. Other advantages and features of the invention not explicitly described will also appear to those in the art. The scope of the invention is to be defined only by the appended claims, and not by the specific embodiments described below.

A flight plan specifies a desired path or trajectory that an aircraft is to follow. For the present purpose, it has two components. A lateral or horizontal path is a sequential set of one or more segments whose endpoints are defined by geographical positions, usually expressed in terms of latitude and longitude. The endpoints are frequently called waypoints, although waypoints are sometimes defined within segments as well, for purposes such as verifying calculated positions. A vertical path defines a desired vertical profile in terms of altitudes and/or flight-path angle referenced to the waypoints. A flight plan can be created by an operations center, dispatcher, a pilot, or even by a computer program.

FIG. 1 illustrates an example of a flight plan representation or model 100 that enables conflict detection in a precise and efficient manner. A geographical area 110 defined by latitudes 111, 112 and by longitudes 113, 114 encloses all the individual segments 120–160 between a departure point 121 and a destination 171. (Segment widths are greatly exaggerated for clarity.) Waypoints 121 and 131 have latitudes, longitudes, and altitudes that specify the endpoints of segment 120, and so forth for the other segments. Using segment 140 as an example, a parallelopiped or tube 142 having a defined finite extent both horizontally and vertically from endpoints 141 and 151 surrounds its nominal trajectory 143. The extents can be set at will, and can be the same or different for each segment or for each endpoint. Dimension 143 symbolizes the lateral extent of segment 140 on either side of the nominal trajectory 144 for that segment. Dimension 145 shows an altitude extent about the nominal altitude profile of trajectory 144, with a lower boundary 146. These extents provide clearance distances for the aircraft from terrain or other hazards. Clearance is required to compensate for a number of factors, such as trajectory-modeling errors, navigation and sensor uncertainty, guidance uncertainty, and mandated clearance offsets.

Each endpoint has the following parameters: latitude, longitude, altitude lower bound, and lateral extent distance. Optional additional parameters can include an altitude upper bound if airborne obstacles are to be detected, and estimated time of arrival (ETA) and ETA error bound if moving obstacles are defined. Bounds must of course be expressed in units consistent with the obstacles against which they are compared. For terrain clearances, for example, the altitude lower bound must be compatible with the reference system of the terrain database, typically feet above mean sea level (MSL), although pressure altitude would typically be used for in-air hazards such as weather and other aircraft. Lateral bound are expressible in terms of latitudes and longitudes collinear with the endpoint, or by maximum deviation from the nominal end point and perpendicular to the line connecting the endpoints of a segment. Rather than fitting segment endpoints together precisely, it is usually desirable to allow a small spatial overlap, to assure that segment boundaries are continuous. This is particularly important for segment boundaries where both course and altitude changes occur. More complex segment polygons or even other shapes can be accommodated. However, it is generally more convenient to divide other shapes into multiple linear segments, defining endpoints for each artificial segment. For example, a curve can be restructured, either once or iteratively, as a number of oversized parallelopiped segments. Rather than being hard boundaries, the bounding parameters of segments can support a statistical interpretation. The entire cruise phase, and any other plan portions which are known to be free of hazards can be ignored if desired, and not represented by segments. For efficiency of checking, an overall flight plan should have as few segments as comport with other factors.

The preceding formulation employs a flat earth model. For flight plans or segments covering large geographical areas, a spherical model can be used. In this case, the boundaries and constraints are planes that pass through the center of the sphere, and a pair of terrain patch corners. An additional plane through the terrain patch corners adds an equality constraint to keep the solution near the spherical surface.

FIG. 2 illustrates a hazard model including an organization of terrain data for facilitating the comparison of the entire trajectory 100 for conflicts. The term "terrain" can include other environmental features, or, indeed any features whatsoever that can be represented in this manner. A hierarchical structure enables a rapid determination of significant regions that require additional checking. A the highest level, geographical area 110, FIG. 1, is a patch having a range of latitudes and longitudes covering the trajectory. The region of area 110 is then divided into four quadrant subregions or subpatches 210–240, each covering half the latitude and longitude ranges of the whole patch. Each quadrant is then itself divided into four further quadrants subareas, as illustrated at 241–244. These are then subdivided as many times as necessary to achieve a desired resolution. Terminal regions, for example, have a very fine resolution, because of the necessity for flying close to a number of individually small obstacles. On the other hand, great-circle routes over flat arctic areas are represented at a very coarse resolution.

Each subpatch has two parameters: a maximum and a minimum height of the terrain within that subregion. The maximum height for each subpatch is the maximum over the maxima of its subpatches, and recursively for their subpatches. The minimum is the recursive minima over the subpatches. The terrain database has a predetermined value for the finest resolution, expressed as a number of terrain points per degree. If the size of a subpatch equals one unit of resolution in both latitude and longitude, the minimum is assumed to be the maximum for that subpatch. This value is stored instead of a pointer to the subpatch, as described below. A designated value pointer value is assigned to all patches having a size smaller than the finest resolution. A patch whose maximum and minimum heights are less than a given threshold are approximated as flat, by storing the maximum height instead of a subpatch pointer. This saves a substantial amount of memory by avoiding recursive searches within a patch—sometimes covering quite a large area.

To afford further memory savings, the latitude and longitude limits of each subpatch are not stored explicitly, but are implicit in the level and location of the subpatch in the entire area. At the top level, a patch that encompasses the trajectory segment of interest has two sets of three parameters each for its latitude and longitude. Both sets function in the same manner, and only those for latitude are described. The minimum and maximum latitudes of the patch are $lat_{min}$ and $lat_{max}$; the number of maximum-resolution samples between those two values is nlat. Thus the finest resolution for the patch is $lat_{delta}=(lat_{max}-lat_{min})/nlat$. The sample nearest the midpoint is $nlat_{mid}=int((nlat+$ 1)/2), and its latitude is $lat_{mid}=lat_{min}+lat_{delta} \times nlat_{mid}$. The three latitude parameters for the quadrantal subpatches of the top patch can then be calculated as $lat_{min1}=lat_{min}$, $lat_{max1}=la_{tmid}$, $nlat_1=nlat_{mid}$ for the two lower-latitude quadrants, and $lat_{min2}=lat_{mid}$, $lat_{max2}=lat_{max}$, $nlat_2=nlat-nlat_{mid}$ for the other two. The definition of $nlat_{mid}$ ensures that $nlat_2$ is always equal to or one less than $nlat_1$. This process continues recursively until $nlat_1=1$ at the highest resolution. Computing these quantities on the fly during the hierarchical described below thus saves a large amount of database storage space for subpatch parameters at the minor cost of computing them if and when they are needed. If the number of sample points in the latitude/longitude range of a patch is even, then its subpatch contains half the number of points; if odd, then the first subpatch is one sample larger than the second.

Figure 3:
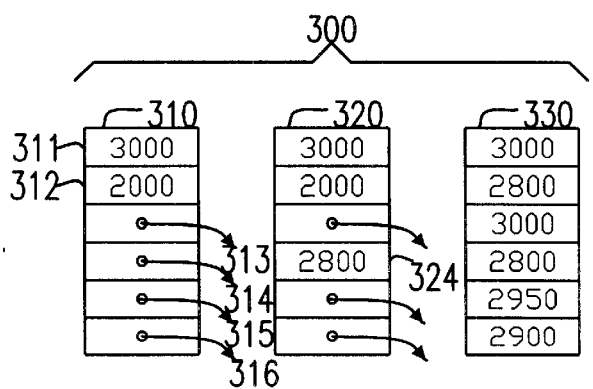
FIG. 3 illustrates a data structure for the terrain representation of FIG. 2.

FIG. 3 depicts a data structure 300 for modeling the subpatches of FIG. 2 in a computer memory. List 310 has a low resolution, with all of the subpatches stored at other locations. Entries 311 and 312 are the maximum and minimum heights within the whole subpatch.. Entries 313–316 are pointers to the locations where a list for each of the quadrants is stored. List 320 represents a patch one of whose quadrants is considered to be flat. Its entry, 324, contains the (constant) height of the terrain in that subpatch. List 330 is a region at the finest resolution, where the height of all subpatches is constant. The maximum and minimum heights in the whole patch are found as constant heights within two of the subpatches.

Checking a flight-plan trajectory for hazard clearance involves comparing each trajectory segment of the plan against a terrain patch large enough to encompass the lateral extent of the segment. A hierarchical search compares a segment to coarse terrain representations, proceeding to finer resolutions only when necessary. Lists 310–330 do not contain any explicit information denoting what particular region or subarea they represent within their parent patches or within area 110, FIG. 1. Instead, the organization of the patch lists in memory implicitly defines their positions, as described above.

Figure 4:
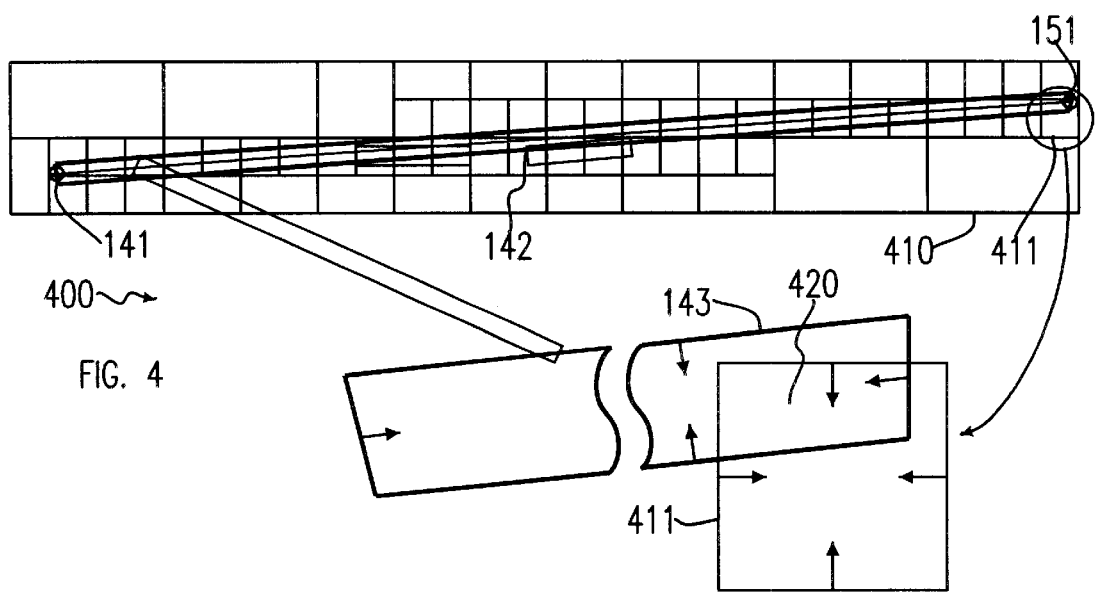
FIG. 4 is a diagram of a typical trajectory segment and its associated terrain patches.

FIG. 4 is an enlarged view of segment 140, FIG. 1. Patches 400 represent the geographical area surrounding this segment. The first question is to determine which terrain patches and subpatches contain segment 140, because these are the only ones that must be investigated for clearance. Large square patches such as 410 that contain a portion of segment 140 are successively divided into smaller square patches such as 411 that underlie a portion of the segment. In FIG. 4, the search need only cover those patches having heavy outlines; the others do not intersect the width of the segment tube. The patches that are searched are subdivided as described in connection with FIG. 5. The final subpatches are usually not all of the same size, because the search proceeds only as far as necessary within each patch.

Within a small patch such as 411, finding the area 420 for which segment 140 covers patch 411 can be converted into a linear-programming problem. That is, area 420 must satisfy eight linear constraints, because it lies in the directions indicated by the arrows from the lines bounding segment 140 and patch 411. Because all patches are bounded by constant latitude and longitude, the patch constraints are $Long_{min} \leq x \leq Long_{max}$ and $Lat_{min} \leq y \leq Lat_{max}$. That is, these are the equations that define the interior of a patch 411. The segment boundary constraints are $a_i x+b_i y+c_i \geq 0$ for $I\epsilon\{1,2,3,4\}$, defining the interior of segment 140. When converted to the form employed in standard linear-programming techniques, this yields six equations in eight variables.

A conventional linear-programming solver performs the calculations. Initializing to, e.g., the lower left corner of patch 411, the solver begins a standard feasibility pass to find a solution set $\{x,y\}$ that satisfies all the constraints. The four constraints that define patch 411 are satisfied; in addition, at least two of the constraints defining segment 140 are satisfied. The remaining constraints—up to two—must be relaxed by introducing slack variables that effectively open up the constraints by pushing them in directions opposite the arrows. In the case shown, the initial point does not meet the constraint on the lower edge of segment 140, so that constraint must be relaxed. The solver attempts to reduce the values of the slack variables to zero while maintaining a non-empty region. If this attempt fails, the segment does not intersect the patch, and that patch is discarded. If the attempt finds a region such as 420 that satisfies all constraints, the aircraft might traverse that region. The solver then enters a minimization pass, choosing an initial point within region 420 and using any convenient method to minimize a cost function that represents the altitude of segment 140. The cost function employed here is $Traj_h=\min(a_h x+b_h y+c_h)$, where $a_h$, $b_h$, and $c_h$ are the coefficients of the line defining the vertical profile of the lower boundary 146 of the trajectory tube. This embodiment simply interpolates linearly along the segment between the heights of the two end points 141 and 151.

Long segments require an approximation to spherical geometry. In this implementation, it is convenient to use $x=r\cos(Long)\cos(Lat)$, $y=r\sin(Long)\cos(Lat)$, and $z=r\sin(Lat)$, where r represents the length of the vector $\{x, y, z\}$. At the surface of the sphere, where $r=1$, the patch boundaries become $\tan(Long_{min}) \leq y/x \leq \tan(Long_{max})$ and $\sin(Lat_{min}) \leq z \leq \sin(Lat_{max})$. Adding a plane through the patch corners adds an equality constraint to keep the solution near the spherical surface. That is, making $a_p x+b_p y+c_p z+d_p=0$ at the patch corners $\{p\}$ forces $r_2=x_2+y^2+z^2=1$ at those points. The segment constraints are $a_i x+b_i y+c_i z+d_i \geq 0$ for $I\epsilon\{1,2,3,4\}$. Obviously, the spherical case requires substituting the spherical equivalents of the $a_h \ldots d_h$, coefficients in the cost function above.

Figure 5:
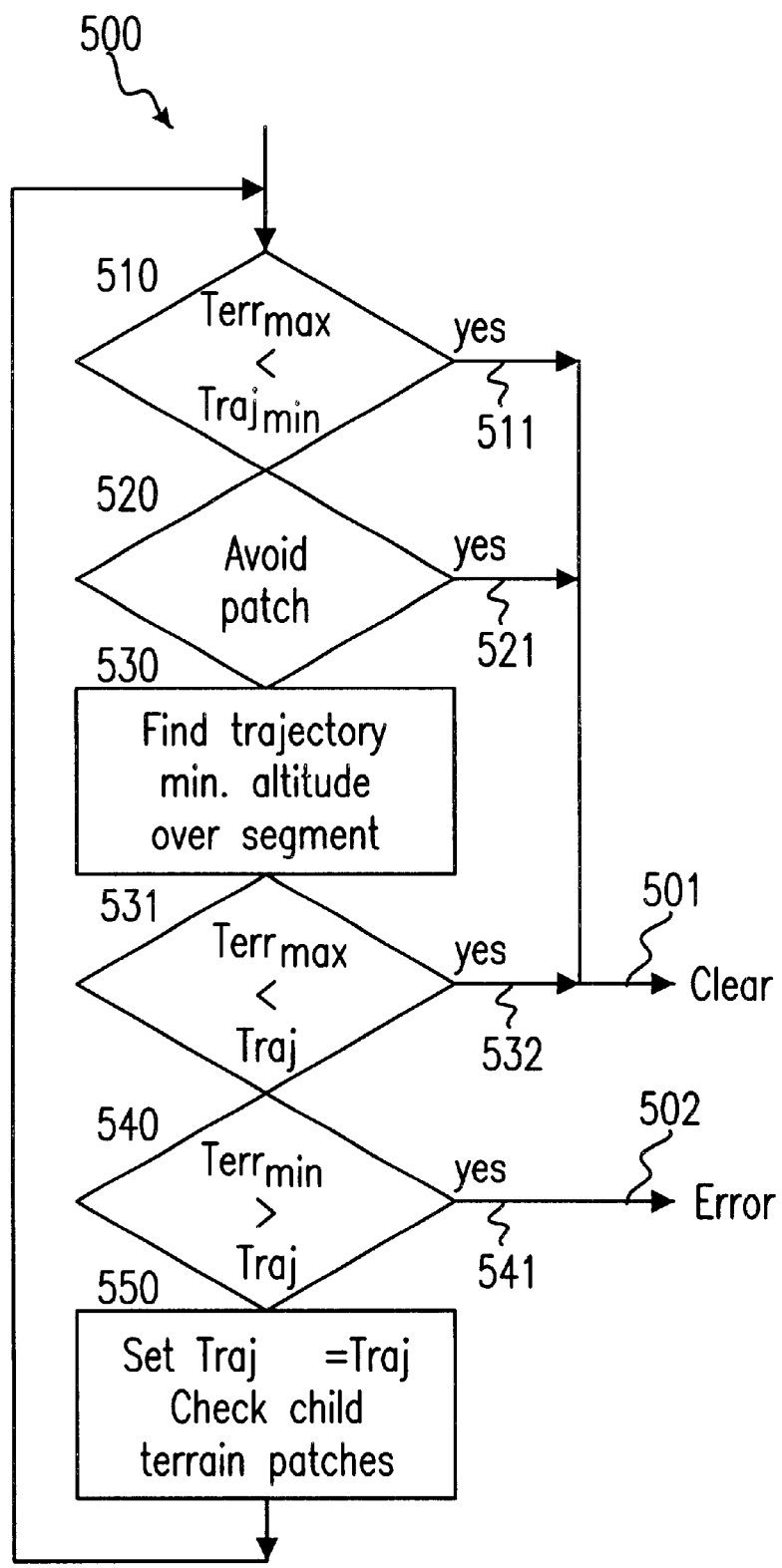
FIG. 5 is a flowchart of a comparison process for determining clearance between a trajectory and a terrain patch.
Figure 6:
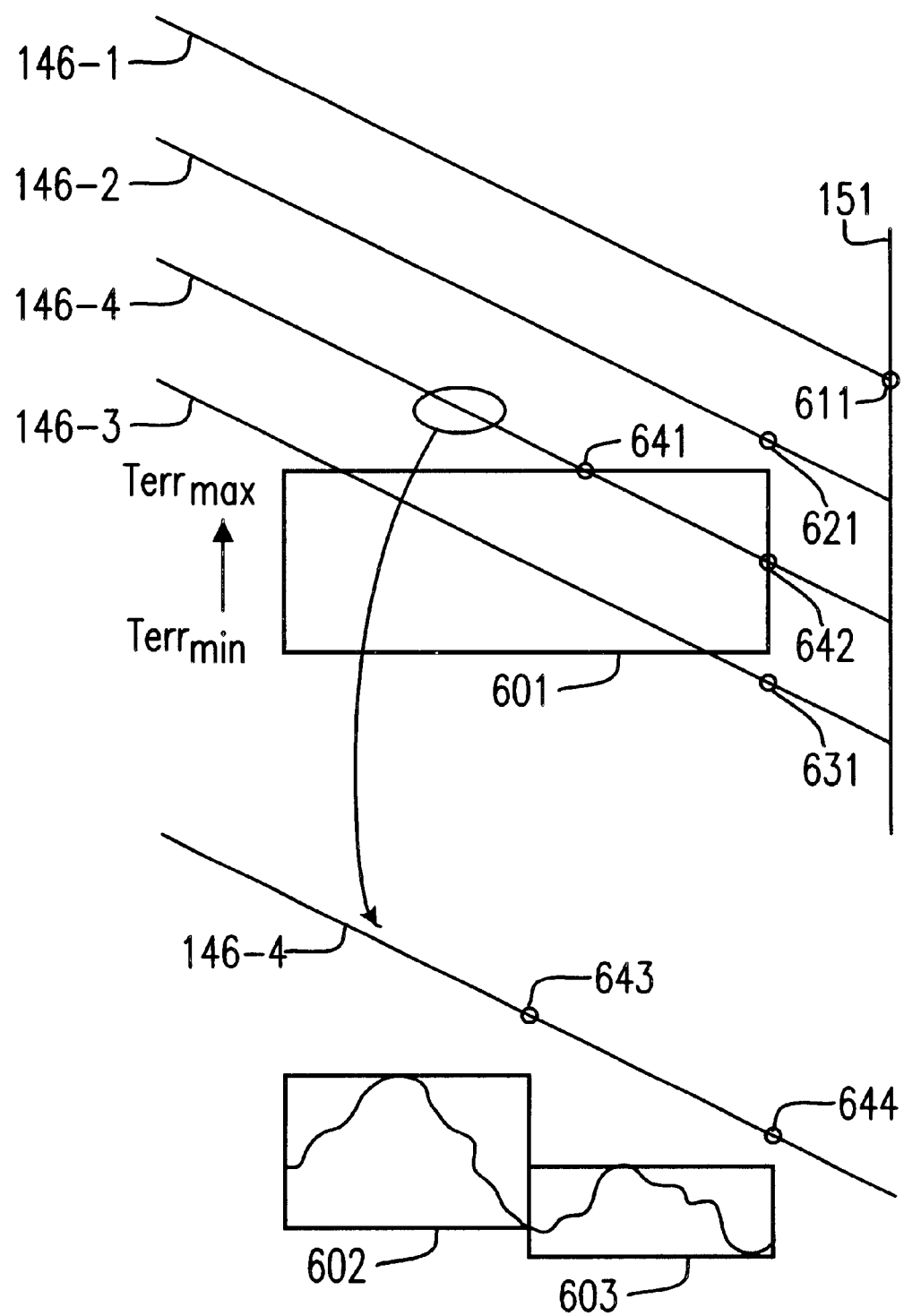
FIG. 6 illustrates the different cases investigated by FIG. 5.

FIG. 5 is a flowchart of a process 500 for determining whether a segment such as 140 intersects the terrain in a patch such as 411, FIG. 4. FIG. 6 shows examples of the various situations that can be encountered. Decision block 510 determines whether the maximum height of the terrain in the patch, $Terr_{max}$, is less than the lowest height of the trajectory over the entire segment. If so, then exit 511 leads to terminus 501, indicating that no intersection is possible. In FIG. 6, line 146-1 symbolizes the lower boundary 146, FIG. 1, of segment 140 for this situation. Box 601 represents a vertical profile of the patch, with increasing altitude indicated by arrow 602. Obviously, if the lowest point 611 (which occurs at endpoint 151 for this segment) of the lower boundary never goes below the maximum height of the terrain, no intersection can occur.

Block 520 determines whether or not the trajectory tube of segment 140 intersects patch 411 at all. If the aircraft avoids overflying the patch completely, then again no intersection can occur, and exit 521 passes to terminus 501.

Block 530 finds the minimum altitude $Traj_{min}$ of the lower boundary of the trajectory tube over the patch itself. Block 531 then asks whether the maximum terrain height is less than this amount. If so, exit 532 again indicates that the segment clears the terrain. FIG. 6 shows the minimum altitude of lower boundary 146-2 occurring at point 621, above $Terr_{max}$.

Block 540 asks whether the minimum terrain height $Terr_{min}$ exceeds the minimum trajectory altitude. If so, exit 541 signals a terrain-intersection error at terminus 502. Line 146-3 demonstrates this situation. The lowest trajectory point at 631 is lower than any altitude within the terrain patch, so that a terrain hit must occur at some location within the patch.

If none of the above conditions obtains, then the trajectory tube might or might not intersect the terrain. Line 146-4 in FIG. 6 passes through the altitude profile of patch 411 from point 641 to point 642, where terrain might or might not exist. Block 550 divides the patch into subpatches 602 and 603 and reiterates the process for each. In this particular situation, lower boundary 146-4 exceeds the maximum terrain height over both of the child patches, at points 643 and 644. Therefore, exit 532 clears the flight plan over both of the subpatches. Some cases require multiple subdivisions, but method 500 eventually produces either a clearance 501 or an intersection error 502. This procedure thus employs a coarse resolution except when a finer resolution is required to determine actual intersection, greatly reducing computation load.

The foregoing has described the checking of hazards that remain stationary in time, such as geographical terrain. It is also advantageous to model moving hazards, such as weather systems, for possible intersection with an intended flight plan. The generic model for moving hazards includes multiple trajectory tubes each having a moving bubble representing a position in time. One trajectory represents the segments of the flight plan of an aircraft, as before. The bubble in this tube surrounds its position at the current time. At least one other trajectory tube represents the "flight plan" of a moving weather system, for example. A bubble in this trajectory surrounds the current position of the system. Further trajectory tubes can be added in a straightforward manner to model any number of hazards or other conditions that one might desire to track. Conflicts between the aircraft and the hazards then become overlaps between the bubbles in both space and time.

FIG. 7 depicts a moving-hazard or trajectory 700 superimposed upon the aircraft flight plan 100 of FIG. 1. Trajectory 700 is a "flight plan" of, for example, a weather system such as an occluded front. That is, the trajectory can be modeled in exactly the same way as flight plan 100, with no requirement for any techniques different from those for modeling the aircraft plan. In fact, the moving hazard could be another aircraft, if desired. Trajectory 700 includes a set of one or more segments such as 710 and 720 having waypoints 711, 721, and 731. These are constructed in the same manner as segments 120–160 shown in FIG. 1, and can have altitude as well as geographic extents. For the illustrative weather system, the larger dimensions indicate the greater area and uncertainty of the anticipated track relative to that of the aircraft. The segments can also have dimensions differing among each other, as depicted in FIG. 7. (Of course, the dimensions of segments 120–160 might also differ among themselves.)

FIG. 7 adds a feature to both trajectories for processing moving hazards. Intersection with stationary terrain involves only comparing the spatial coordinates of trajectory tube 100 with terrain at the same coordinates, so that a three-dimensional comparison suffices. A hazard capable of motion adds the element of time, and thus requires a four-dimensional comparison to detect intersection. Therefore, trajectory 700 incorporates a bubble 701 around the present position 702 of the aircraft, and trajectory 700 adds a bubble 703 around a nominal position 704 of the weather. Both of the bubbles have a length dimension along their tracks that parameterizes the uncertainty in the present position. Although this length is constant, it could change if desired to reflect, say, increasing uncertainty along the anticipated trajectory, just as the increased width of segment 720 represents more lateral uncertainty in the weather's track.

Detecting whether the aircraft's flight plan conflicts with the moving hazard now becomes a determination as to whether or not the bubbles 701 and 703 overlap in both space and time.

The cost function for the linear-programming formulation becomes $T^* = \min(t_{end} - t_{start})$, where $t_{end}$ and $t_{start}$ are two free parameters that bound both bubbles 701 and 703 in time. The earliest and latest possible times that the two bubbles can overlap are denoted $t_{min}$ and $t_{max}$. Their values depend upon the definition of the trajectory tubes 100 and 700: $t_{min=max(tsa}, t_{sh})$ and $t_{max=min(tea,the)}$, where the four variables are the start and end times of the trajectories of the aircraft and the hazard. There are fourteen inequality constraints of the type discussed in connection with FIG. 4. Twelve of these are linear equations that represent the six sides of the two tubes 100 and 700. The remaining two are constraints in the time dimension: $t_{max} \geq t_{end}$ and $t_{min} \leq t_{start}$. Determination of overlap varies the free parameters $t_{end}$ and $t_{start}$ within the fourteen constraints. If there are any such values, the cost function T*, as evaluated by conventional linear-programming techniques, will be less than zero. Such an intersection in both space and time of the two trajectory tubes signals an alert condition.

In this embodiment, the search for a conflict compares all possible combinations of aircraft and hazard trajectories. The computationally least intensive comparison is to eliminate segments that do not overlap in time, because this involves the evaluation of only two scalar inequalities. Hence, temporal elimination is performed first. Spatial intersection is then handled automatically during the linear-programming feasibility pass, in the same manner in which intersections between the trajectory and the terrain are detected.

Figure 8:
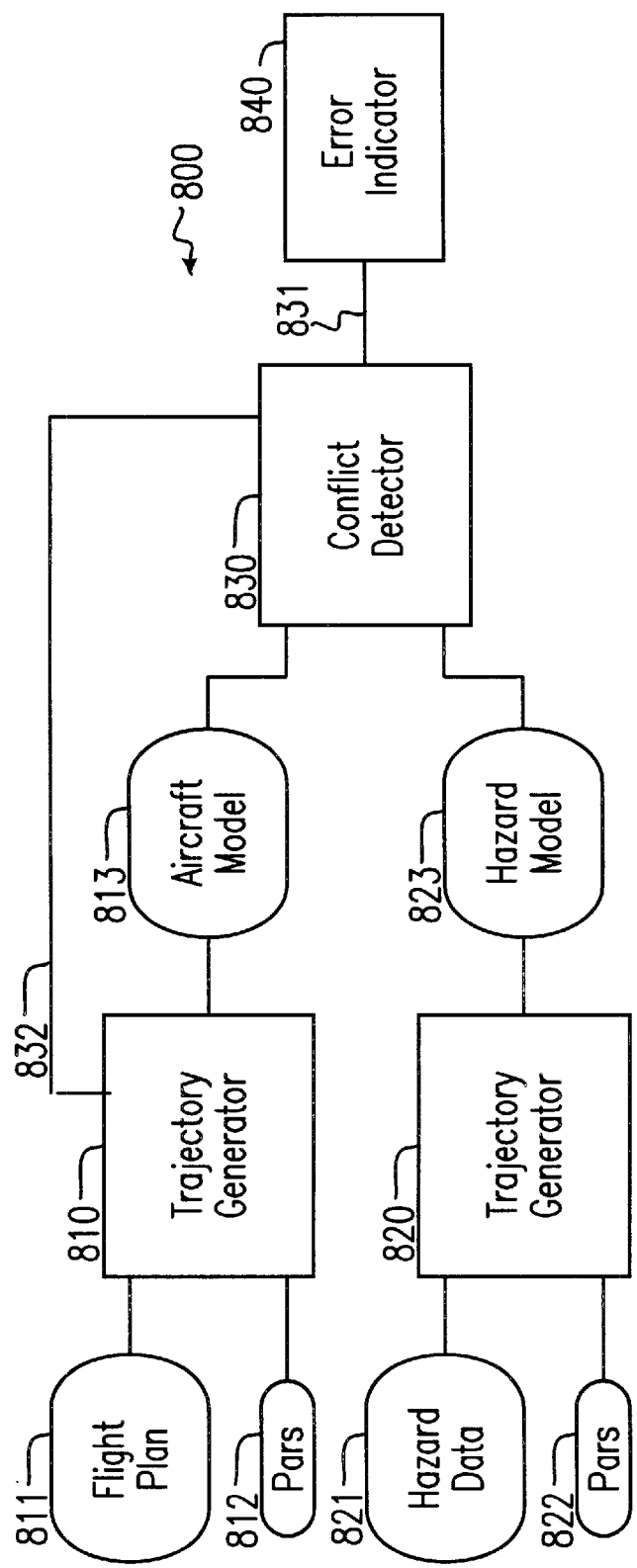
FIG. 8 is a block diagram of a system for evaluating a flight plan according to the invention.

FIG. 8 shows a system 800 for evaluating a flight plan according to the invention. Trajectory generator 810 receives flight plan 811 and parameter values 812, and converts them into segment parallelepipeds or polygons. These polygons constitute a model 813 of the trajectory of the aircraft flight plan, as shown in FIG. 1. Hazard generator 820 receives raw hazard data 821 and, at least for moving hazards, parameter values 822. This data can be received before the aircraft takes off, or even in flight; moving hazards frequently change unpredictably. Converter 820 produces a model 823 of the hazard. For terrain hazards, the model includes the hierarchical patch altitudes stored by geographic position as shown in FIGS. 2 and 3. For moving hazards, the model contains segments constructed similarly to those of the aircraft trajectory, as shown in FIG. 7. In this case both models include time information. Other hazards might be modeled differently.

Detector 830 inputs models 813 and 823 and determines whether there is a conflict between them. In the case of a terrain hazard, for example, the detector finds any point where an extent of an aircraft trajectory conflicts with an altitude feature of the terrain at that same geographic point. For a moving hazard, a conflict is an overlap of the hazard trajectory with the aircraft trajectory in both space and time—that is, an overlap of the bubbles in the two trajectories. Other hazard models may detect conflicts in other ways. Error condition signal 831 indicates a conflict. This signal may trigger an alarm 840 to the system operator, to the flight-plan designer, or to others. Dashed line 832 symbolizes that the conflict condition can also initiate editing or modification of the flight plan to avoid the conflict. This modification can take place before the start of the flight or in flight.

System 800 can be implemented in many ways, for example in a general-purpose computer having a processor, memory, and input/output devices. A dedicated computer, integrated with an aircraft's navigation and communications systems, is also an option.

Figure 9:
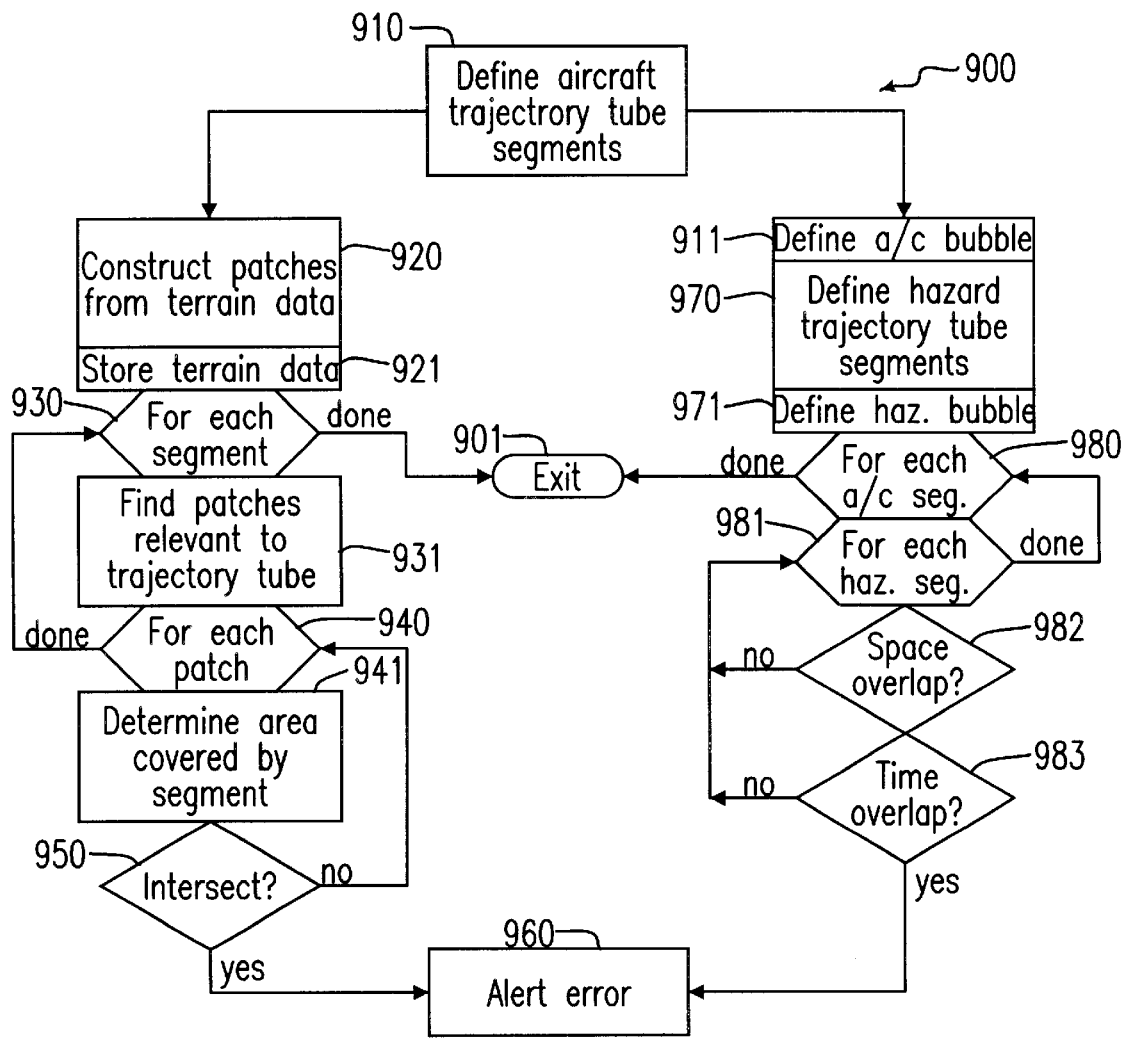
FIG. 9 is a flowchart of the operation of the system of FIG. 8.

FIG. 9 summarizes a process 900 for evaluating a flight plan according to the invention. Starting with the aircraft flight plan from an operations center or other source, block 910 defines the segments of a trajectory tube surrounding the plan, from the waypoints and from input values of the parameters as described in connection with FIG. 1.

Block 920 constructs the terrain data as a hierarchical set of patches and subpatches of a geographic area, listing maximum and minimum altitudes and pointers to subpatches, in such a way that the location and level of the patches is implicit in the data organization, FIGS. 2 and 3. Block 921 stores the relevant portion of the terrain data in a computer on the ground or in the aircraft. Block 930 iterates through the segments as block 931 finds all the terrain patches relevant to the trajectory tube. Block 940 loops through the patches in each segment while block 931 determines the patch area covered by the tube, using linear-programming constraints as illustrated in FIG. 4. Block 950 determines whether or not the current segment intersects the terrain, using the method of FIGS. 5 and 6. If an intersection occurs at any point, block 960 issues an error or alert signal indicating that the flight plan is unsafe.

If moving hazards are being monitored, block 911 defines a bubble around the aircraft. As discussed in connection with FIG. 8, this bubble has both spatial and temporal parameters. Block 970 constructs or otherwise defines one or more segments of a trajectory tube for the moving hazard. Multiple hazard tubes, not shown, are also possible. Block 971 defines a bubble incorporating the spatial and temporal parameters of the hazard. Blocks 980 and 990 iterate through the segments of both trajectory tubes. Blocks 991 and 992 detect whether the tubes overlap in space and time, using both their spatial and temporal constraint equations. If an overlap exists for any segment, block 960 issues an error alert. If no portion of the entire flight plan is unsafe for any of the modeled hazards, exit 901 indicates that it is acceptable. Error and safe conditions can be signaled to the aircraft pilot or to another person.

Conclusion

The present invention evaluates a predicted trajectory for intersection with any of a number of features in three or four dimensions that can be modeled as shapes such as parallelepipeds or other polygons having definable extents and/or motions. Finite-volume trajectories can incorporate minimum clearances and uncertainties. Bounding the aircraft trajectory tube in a hierarchical fashion permits efficient searches for points of proximity to the hazards. Detection of conflicts between the aircraft trajectory tube and both stationary and moving hazards employs well-developed, efficient techniques of constrained optimization. Communication of the results of the flight-plan evaluation to a user allows revisions to be performed quickly and easily.

Having described preferred embodiments thereof, we claim as our invention:

1. A method of evaluating a predicted plan for conflict with a hazard, comprising:

defining the predicted plan as a trajectory including a set of segments having parameters denoting finite spatial extents, the parameters for all segments being specifiable arbitrarily and independently of those for any others of the segments;

representing a hazard as a collection of features having finite spatial extents;

determining whether at least a portion of at least one of the segments conflicts with any of the features of the hazard;

if so, signaling a conflict.

2. A medium bearing computer-readable representations of instructions and data for causing a programmable computer to perform the method of claim 1.

3. The method of claim 1 where the plan is a predicted aircraft flight plan.

4. The method of claim 1 where the hazard model includes a plurality of terrain patches in a geographic area, each patch having an altitude parameter.

5. The method of claim 4 where the trajectory segments have altitude parameters.

6. The method of claim 5 where conflict determination comprises detecting whether the altitude parameter of any segment does not exceed the altitude parameter of the terrain patches at the same location in the geographic area.

7. The method of claim 6 where each patch further includes a plurality of pointer to subpatches each having a maximum altitude.

8. The method of claim 1 where the hazard model includes a set of segments each having an independently specifiable finite extent in a plurality of dimensions.

9. The method of claim 8 where both of the models include bubbles having respective finite extents and times associated therewith.

10. The method of claim 9 where the detector determines whether the bubbles conflict with each other in both space and time.

11. A method of evaluating a predicted plan for conflict with a hazard, comprising:

defining the predicted plan as a trajectory including a plurality of segments each having independently and arbitrarily specifiable parameters denoting finite spatial extents;

storing a database of data representing terrain;

for each segment, determining whether at least a portion of at least one of the segments intersects the terrain represented by the data;

if so, signaling an error condition.

12. A medium bearing computer-readable representations of instructions and data for causing a programmable computer to perform the method of claim 11.

13. The method of claim 11 where the plan is a predicted aircraft flight plan.

14. The method of claim 11 where the plan includes altitude information, and wherein at least one of the parameters of each segment denotes the altitude information.

15. The method of claim 14 where the terrain data is stored as a hierarchical set of patches and subpatches each representing a certain part of the geographical area.

16. The method of claim 15 wherein the terrain data for each patch includes a maximum altitude for that patch, a minimum altitude for that patch, and at least one pointer to a subpatch for that patch.

17. The method of claim 14 wherein determining whether at least a portion of at least one of the segments intersects the terrain represented by the data comprises:

determining whether a first altitude of terrain in a certain area bears a first relation to a first altitude of one of the segments;

if not, repeating the above step for each of a plurality of subareas;

if so, signaling the error condition.

18. The method of claim 17 wherein determining whether at least a portion of at least one of the segments intersects the terrain represented by the data further comprises:

calculating a first altitude of the one segment associated with the certain area;

determining whether the first altitude associated with the area bears the first relation to the first altitude of one of the segments;

if so, omitting the signaling step.

19. The method of claim 11 further comprising:

modeling the segments as systems of inequality constraints;

modeling a plurality of patches of the terrain as systems of inequality constraints;

determining portions of the patches associated with particular ones of the segments as those portions that satisfy the systems of constraints.

20. The method of claim 19 wherein the determining step comprises:

constructing a cost function associated with the segments;

minimizing the cost function within the portions of the patches.

21. The method of claim 11 wherein the plan includes time information, and wherein at least one of the parameters of each segment denotes the time information.

22. The method of claim 11 further comprising:

constructing in the plan trajectory a plan bubble having parameters denoting finite spatial extents and times;

defining a hazard trajectory including a set of segments and a hazard bubble having parameters denoting finite spatial extents and times;

for each segment of the plan trajectory, determining whether the plan bubble overlaps the hazard bubble in both space and time;

if so, signaling the error condition.

23. The method of claim 11 wherein determining whether at least a portion of at least one of the segments intersects the terrain represented by the data is performed only in spatial coordinates, independently of time.

24. A method of evaluating a plan for conflict with a hazard, comprising:

defining the predicted plan as a plan trajectory including a set of segments each having parameters denoting finite spatial extents;

defining the hazard as a hazard trajectory including a set of segments each having separate and independently specifiable parameters denoting finite spatial extents;

for each segment, determining whether the plan bubble overlaps the hazard bubble in both space and time;

if so, signaling the error condition.

25. A medium bearing computer-readable representations of instructions and data for causing a programmable computer to perform the method of claim 24.

26. The method of claim 24 where the plan is a predicted aircraft flight plan.

27. The method of claim 24 where the trajectories include altitude information, and wherein at least one of the parameters of each segment denotes the altitude information.

28. The method of claim 24 further comprising:

modeling the bubbles as systems of inequality constraints;

determining bubble overlap as regions that satisfy all the systems of constraints.

29. The method of claim 28 where determining bubble overlap comprises:

constructing a cost function associated with the bubbles;

detecting a certain value of the cost function within the regions.

30. The method of claim 24 where one of the spatial extents of a hazard bubble depends upon at least one of the spatial extents of the hazard-trajectory segment in which it is located, and another of the spatial extents of the hazard bubble is independent of the spatial extents of such hazard segment.

31. The method of claim 30 where the other of the hazard-bubble spatial extents is constant for all segments of the hazard trajectory.

32. The method of claim 30 where the other of the hazard-bubble spatial extents depends upon a characteristic of the hazard.

33. A system for evaluating a predicted plan with a hazard, comprising:

a trajectory model including a set of segments within a geographic area, each of the segments having a finite extent in a plurality of dimensions;

a hazard model including data representing predetermined features of a hazard as a plurality of nested patches and subpatches within the geographic area of the trajectory model;

a detector for determining whether at least a portion of any of the segments conflicts with the hazard model within any portion of the geographic area;

an indicator responsive to the detector for producing an error condition indicating the conflict.

34. The system of claim 33 where the plan is a predicted aircraft flight plan.

35. The system of claim 33 where each of the trajectory segments has an altitude extent.

36. The system of claim 35 where the hazard model includes data representing altitudes of terrain over the geographic area.

37. The system of claim 36 where the detector determines whether the altitude extent of any segment does not exceed an altitude of the terrain at any point in the trajectory model.

38. The system of claim 36 where the hazard model represents the geographic area as a plurality of patches each having maximum altitudes.

39. The system of claim 38 where each patch further includes a plurality of pointers to subpatches each having a maximum altitude.

40. The system of claim 33 where the detector determines conflicts on the basis of spatial extents, independently of time.

41. A system for evaluating a predicted plan with a hazard, comprising:

means for modeling a trajectory including a set of segments within a geographic area, each of the segments having a finite independently specifiable extent in a plurality of dimensions;

means for modeling a hazard including data representing predetermined features of a hazard within the geographic area of the trajectory model;

means for determining whether at least a portion of any of the segments conflicts with the hazard model within any portion of the geographic area;

means responsive to the determining means for producing an error condition indicating the conflict.

42. The system of claim 41 where both the trajectory segments and the hazard data include altitude information, and where the determining means detects a conflict between the altitude information in the trajectory segments and that in the hazard data.

43. The system of claim 41 where the hazard data includes a further set of segments within the geographic area and having a finite extent in a plurality of dimensions, and where the determining means detects a conflict in both space and time between the trajectory segments and the hazard segments.

44. A data structure for evaluating a predicted plan, comprising a predicted trajectory including a plurality of segments defined by waypoints, each of the segments including a horizontal path having a lateral extent parameter and a vertical path including an altitude extent parameter, at least one of the parameters for each segment is independent of the corresponding parameter for all other segments in the same trajectory.

45. The data structure of claim 44 where the trajectory is a predicted flight plan for an aircraft.

46. The data structure of claim 44 where each of the waypoints has parameters denoting both a geographical position and an altitude.

47. The data structure of claim 44 where the trajectory forms a parallelopiped defined by a system of inequality constraints.

48. The data structure of claim 44 further comprising a second trajectory including a second plurality of segments defined by waypoints and each including a path having a lateral extent parameter.

49. The data structure of claim 48 where the second trajectory is a predicted track of a hazard.

50. The data structure of claim 48 where at least some of the second plurality of segments have altitude extent parameters.

51. The data structure of claim 48 where the second trajectory further includes a bubble having a spatial extent and an associated time.

52. The data structure of claim 51 where the first trajectory also includes a bubble having a spatial extent and an associated time.

53. The data structure of claim 44 where both the lateral extent parameter and the altitude extent parameter for each segment are independent of those for all other segments in the trajectory.

54. A data structure for evaluating a predicted plan, comprising a hierarchical plurality of patches and subpatches together forming a geographic area, each patch containing an altitude parameter and at least one pointer to a subpatch representing a smaller portion of the area covered by its parent patch.

55. The data structure of claim 54 where at least some of the subpatches themselves contain the altitude parameter for all of their parent patches.

56. The data structure of claim 54 where at least some of the subpatches themselves contain at least one pointer to a further subpatch and also contain at least one altitude parameter for another further subpatch.

57. The data structure of claim 54 where the patches and subpatches are organized so as to denote their geographic position within the area implicitly, and where the patches and subpatches themselves contain no explicit position information.

* * * * *